United States Patent [19]
Keilert

[11] Patent Number: 5,628,947
[45] Date of Patent: May 13, 1997

[54] PROCESS FOR THE SIMULTANEOUS DRYING AND CRYSTALLIZATION OF CRYSTALLIZABLE THERMOPLASTIC

[75] Inventor: Jurgen Keilert, Kleinwallstadt, Germany

[73] Assignee: Rieter Automatik GmbH, Germany

[21] Appl. No.: 362,432

[22] PCT Filed: Mar. 3, 1994

[86] PCT No.: PCT/EP94/01007

§ 371 Date: Feb. 15, 1995

§ 102(e) Date: Feb. 15, 1995

[87] PCT Pub. No.: WO94/25239

PCT Pub. Date: Nov. 10, 1994

[30] Foreign Application Priority Data

Apr. 29, 1993 [DE] Germany ............... 4314162.5

[51] Int. Cl.⁶ ............... B29C 47/88; B29B 9/06
[52] U.S. Cl. ............... 264/143; 264/178 F; 264/235; 264/346; 425/71; 425/313
[58] Field of Search ............... 264/143, 141, 264/178 R, 178 F, 179–180, 235, 346; 425/71, 308, 313

[56] References Cited

U.S. PATENT DOCUMENTS

| | | | |
|---|---|---|---|
| 2,887,725 | 5/1959 | Vickers et al. | 264/141 |
| 2,975,483 | 3/1961 | Cooper et al. | 264/143 |
| 3,544,525 | 12/1970 | Balint et al. | 264/143 |
| 4,180,539 | 12/1979 | Clarke | 264/180 |
| 4,528,157 | 7/1985 | Lettner et al. | 264/143 |
| 5,182,115 | 1/1993 | Nogossek et al. | 264/143 |
| 5,310,515 | 5/1994 | Jürgen et al. | 264/143 |
| 5,441,394 | 8/1995 | Keilert et al. | 264/178 F |
| 5,474,435 | 12/1995 | Hunke | 264/143 |

FOREIGN PATENT DOCUMENTS

| | | | |
|---|---|---|---|
| 2140265 | 2/1973 | Germany . | |
| 2655840 | 6/1978 | Germany | 264/143 |
| 3900250 | 1/1989 | Germany . | |
| 4133329 | 4/1993 | Germany | 264/143 |
| 90/07408 | 7/1990 | WIPO . | |

OTHER PUBLICATIONS

Publication, Database WPI, Derwent Publications, Ltd., London, Great Britain, 23 Jan. 1984.
Patent Abstract of Japan, Japanese Patent No. A 59 012 805, In the Name of Mitsubishi Kasei Kogyo KK, dated 23 Jan. 1984 (23.01.84).

*Primary Examiner*—Jeffery R. Thurlow
*Attorney, Agent, or Firm*—Banner & Witcoff, Ltd.

[57] ABSTRACT

A process for the simultaneous drying and crystallization of crystallizable thermoplastic synthetic material (plastic), e.g. polyethylene terephthalate, in which plastic from the melt is extruded in cord form, solidified at the surface by quenching in water and crystallized by gas treatment and dried, using a device for cooling and drying the cord emerging from dies having a casting gutter with its acceptance end arranged beneath the dies and a device producing a flow of coolant on the casting gutter within a quenching section, a subsequent dewatering section in which the casting gutter has apertures for the free flow of the coolant, a subsequent drying section in which the casting gutter has closely spaced nozzles for the passage of gas and a granulator downstream of the drying section. The lengths of the quenching, dewatering and drying sections must be such, taking account of the rate of creep of the cord along the casting gutter, that the passage time in the quenching section is a maximum of some 1.5 seconds to attain a cord surface temperature of at least 100° C., in the dewatering section at most some 0.1 second and in the drying section at most about 20 seconds for crystallization, with the surface temperature at the end of the quenching section largely maintained.

5 Claims, 1 Drawing Sheet

PROCESS FOR THE SIMULTANEOUS DRYING AND CRYSTALLIZATION OF CRYSTALLIZABLE THERMOPLASTIC

BACKGROUND AND SUMMARY OF THE INVENTION

The invention concerns a process for simultaneous drying and crystallization of stranded crystallizable thermoplastic such as polyethylene terephthalate, in which the plastic is extruded from the melt as strands, solidified at the surface by quenching in water, crystallized by treatment with gas, and dried, using a mechanism for cooling and drying of strands leaving the dies having a discharge chute with its intake end under the dies and a system producing a flow of coolant liquid within a quenching section, with a following dewatering section in which the discharge chute has openings for the free passage of the coolant liquid, with an attached drying section in which the discharge chute has closely spaced nozzles for passage of gas, and with a granulator following the drying section.

Such a process, in which molten polyester strands are first quenched in water, then granulated, and finally crystallized, as the granulation, in a container with heating at a temperature of greater than 130° C. for 2 to 30 minutes, is known from German Laid-Open Patent 19 05 677. A further development of this process is also known from German Laid-Open Patent 21 40 265. In that process, the plastic ribbons are first quenched in a water bath and are then carried through a housing, the interior of which is heated by hot gas that is blown in. The treatment with the hot gas lasts for 2 to 3 minutes, with a gas temperature of 110° to 250° C.

The invention is based on the objective of designing the process step of drying and crystallization in a well-known and practically proven mechanism for cooling and drying of strands of crystallizable thermoplastic leaving the dies, so as to give short processing times. It is intended that the equipment which is known from German Patent 39 00 250 C2, as shown particularly in FIG. 2 of this patent, be used.

The objective has been achieved with this patent in such a manner that the lengths of the quenching section, the dewatering section, and the drying section have been selected, considering the rate of flow of the strands along the discharge chute, so as to give a processing time of not more than 1.5 seconds in the quenching section to produce a strand surface temperature of at least 100° C., not more than about 0.1 second in the dewatering section, and not more than about 20 seconds for crystallization in the drying section, with the surface temperature at the end of the quenching section being generally maintained.

The process carrried out using the known mechanism, the lengths of which must be properly adjusted for this purpose, brings the surprising result that the time for crystallization, during which the strands are held at a temperature of at least 100° C. following their quenching, can be considerably reduced in comparison with the known process. Specifically, the crystallization time can be reduced to the processing time in the drying section, which is not greater than about 20 seconds. This surprising result appears because of the flow of temperature-controlled air over the strands so that they can be kept at their surface temperature, i.e., at least 100° C., over practically the entire length of the drying section. As a result, there is no residual surface water which could interfere with the crystallization. In the known equipment, there is a substantial quantity of surface water because there is no intensive dewatering of the strands or granules before the region in which crystallization occurs. The water must first be evaporated in the crystallization region, removing so much heat from the material that the crystallization process is substantially slowed. This loss of heat must be compensated by adding heat to the region involved. That does not occur in the process according to the invention, as in this case the dewatering section assures that the strands arrive at the drying section practically free of water. If there is still surface water on the strands when they arrive at the drying section, it is completely removed at the very beginning, so that the drying section can produce its action on crystallization practically completely free of the harmful effect of residual water. There is a further advantage in that the process of the invention can be operated in equipment of relatively simple design which has been proven in practice. That substantially reduces the equipment cost.

Dewatering in the dewatering section is particularly intensive if the strands are exposed to an air flow to dry them after they leave the cooling liquid.

It is convenient to chop the strands into granules in a granulator connected to the drying section. The granules, which are dry when produced, can then be held longer at the surface temperature of the strands in the vicinity of the drying section without any problems occurring due to evaporation of residual water. Thus the crystallization process can be continued economically.

BRIEF DESCRIPTION OF THE DRAWINGS

One example embodiment of the invention is presented, using the figure.

DETAILED DESCRIPTION OF THE PREFERRED EMBODIMENT

Figure 1:
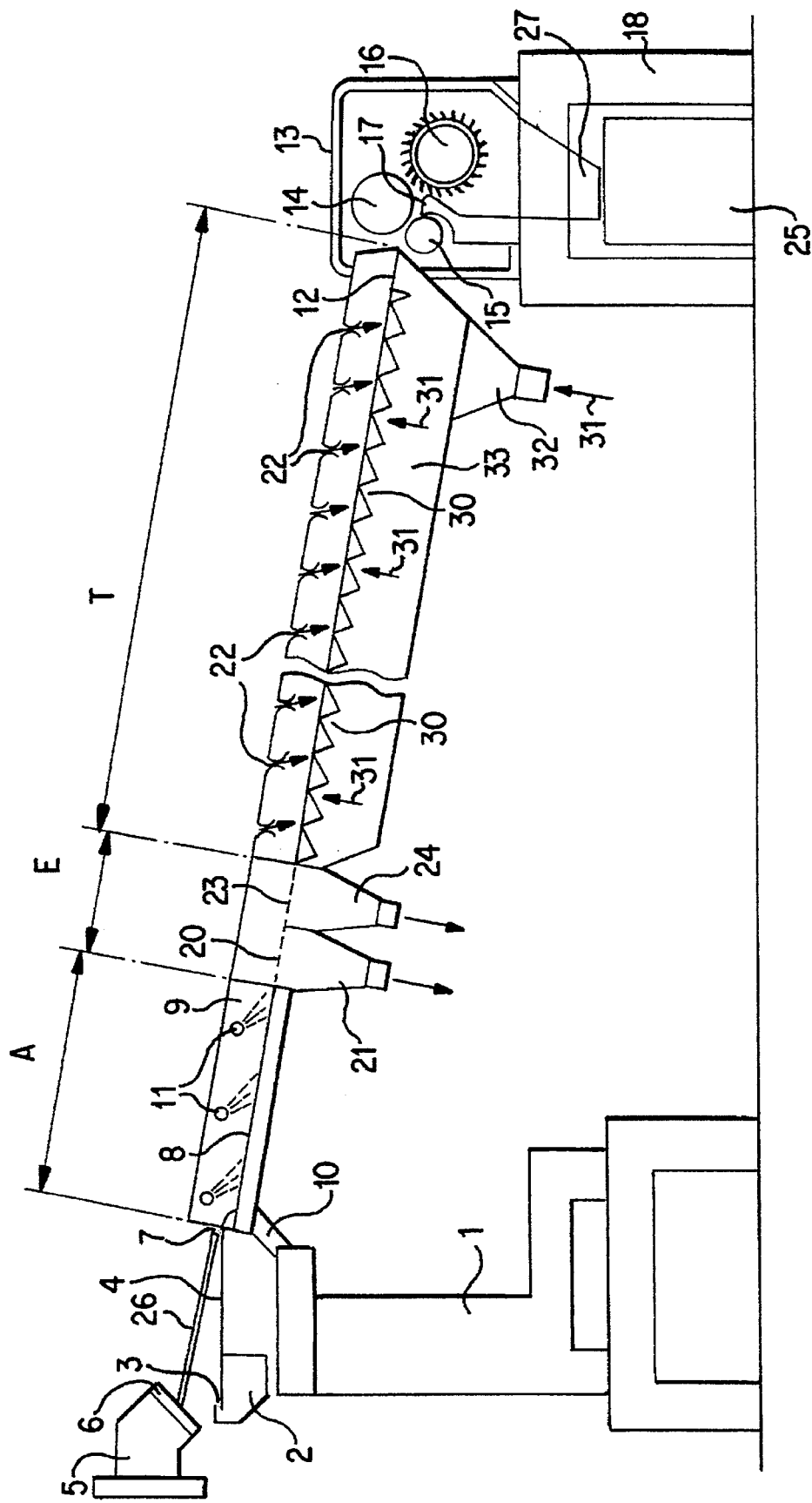

The figure shows a mechanism adapted to carrying out the process of the invention. The mechanism has a stand 1 upon which a water header 2 is mounted. Water, which serves as the coolant liquid, is provided to the water header in the known manner. The coolant liquid flows out of the slot 3 onto the discharge table 4, running over it to the right as a sheet of water which carries along with it the strands 26 of a crystallizable thermoplastic which fall onto the discharge table 4. There is an assembly of dies 5, of which one die 6, is shown, above the discharge table. Molten thermoplastic is provided to the die assembly 5 in the known manner, and is forced out through die 6. The design of such a die assembly is known. Corresponding to that design, there are several dies 6 aligned side by side in the assembly shown in the figure.

Strands leaving the dies 6 first fall on the discharge table 4 and are carried along with the sheet of water flowing over the discharge table 4 until they pass over the end 7 of the discharge table to the discharge chute 8, upon which they slide along in parallel. The discharge chute 8 is mounted in the housing 9, the left side of which is supported on the stand 1 by the arm 10. There are six cooling water spray nozzles in the housing 9. If necessary, they spray added coolant, i.e., specifically water, onto the discharge chute 8, thus increasing the cooling action exerted on the plastic strands. The discharge chute 8, at its lower end 12, carries the plastic strands 26 sliding through it to the granulator 13, which has two feed rolls 14 and 15 and the cutting roll 16. The cutting roll 16 works against the counterknife 17, which also acts as the feed table. This design of a granulator is itself known. The granulator 13 is mounted on the base 18.

The portion of the discharge chute 8 described above, over which the coolant flows, forms the quenching section A, to which the dewatering section E is attached. The dewatering section E includes the water drain 21 into which the water coming from the quenching section A flows directly through the gap 20 in the discharge chute 8. The dewatering section E also includes the air shaft 24, following the gap 20. Air is drawn through the strands 26 sliding along the discharge chute 8 and through the air shaft in the direction of the arrow. The discharge chute 8 is designed with a screen 23 in this portion to allow the air flow. Thus the strands 26 leave the dewatering section E practically completely free of water.

The drying section T is connected to the dewatering section E. In this region the discharge chute 8 has closely spaced inlet nozzles 30 for a flow of gas, particularly a flow of air, indicated here by the arrow 31. The gas stream is directed into the plenum 33 through the shaft 32. The plenum extends under the drying section part of the discharge chute and has the inlet nozzles 30. The gas flows around the plastic strands 26 which have been conducted into the drying section and raises them off the floor of the discharge chute so that the movement of the plastic strands 26 is largely frictionless. The inlet nozzles 30 are provided at a sufficient density for that purpose.

The inlet nozzles 30 are formed by slotted or perforated nozzles running obliquely upward, shown in the figure as saw teeth. Such slotted nozzles are known. It should be noted, though that it is also possible to use inlet nozzles running vertically through the base of the discharge chute; but the air flow as directed by them does not tend to promote the movement of the plastic strands 26. Such added promotion of the movement can be attained by placing feed nozzles 22 above the inlet nozzles 30 so that a gas flow, particularly an air flow, is directed obliquely downward on the downward-moving plastic strands.

Due to the design of the preceding dewatering section E, the drying section T receives superficially cooled plastic strands 26 which are practically completely free of cooling water. Any small amounts of residual water still adhering to the plastic strands 26 is dried up immediately at the beginning of the drying section T by the air flow from the inlet nozzles 30, so that dry plastic strands pass through practically the entire length of the drying section. Thus the surface temperature of the strands can be held constant through the entire length of the drying section by proper adjustment of the temperature of the air supplied through the shaft 32. The temperature is held at a level required for crystallization to occur in this region. For that purpose, heaters or coolers may be provided in the air shaft 32 if needed, depending on the temperature required for the plastic being processed. Therefore the crystallization of the plastic strands 26 can take place in a region and during a time where the plastic strands 26 are free of surface water, so that the crystallization process cannot be impaired, and in particular cannot be delayed, by any process of evaporation of residual water on the surfaces of the plastic strands.

It must be noted that the dewatering section E can comprise just a water drain 21 if enough water can be removed by that so that residual water adhering to the strands 26 can be completely removed at the beginning of the drying section T, in order that there is still a sufficiently long region in the drying section T into which the dry strands can be directed and where sufficient crystallization will occur.

The granules produced by the granulator 13 are taken through the chute 27 to the container 25 in which the granules can, if necessary, be held at a temperature corresponding to the surface temperature of the strands in the drying section T by blowing in heated air, so that the crystallization process can continue in the granules. In this way, plastic strands or granules are produced in which the plastic is adequately crystallized. That is important for further processing of the granules because the granules are considerably more pourable in the crystalline state than in the amorphous state. In the amorphous state the granules tend to agglomerate. As has been shown, this effect can be avoided by treating the plastic material so that it is at least partly crystallized, 20% in the case of polyethylene terephthalate (PET). The following table shows the data for one appropriate embodiment.

TABLE

| Treatment of PET | | | | |
|---|---|---|---|---|
| Room temperature (°C.) | 21 | 21 | 23 | 23 |
| Nozzle assembly 5 | | | | |
| Mass throughput (kg/hr per strand) | 30 | 50 | 80 | 100 |
| Melt temperature (°C.) | 286 | 287 | 285 | 285 |
| Quenching section A (m) | 0.7 | 0.7 | 1.3 | 1.3 |
| Water throughput (m³/hr) | 1.6 | 1.6 | 1.6 | 2.0 |
| Water temperature (°C.) | 26 | 26 | 25 | 24 |
| Dewatering section E (m) | 0.3 | 0.3 | 0.3 | 0.3 |
| Suction (mbar) | 0 | 0 | −2 | −6 |
| Drying section T (m) | 6 | 6 | 6 | 6 |
| Temperature of the air stream (°C.) | 31 | 32 | 26 | 32 |
| Granulator 13 | | | | |
| Strand velocity (m/min) | 40 | 50 | 100 | 120 |
| Granules: | | | | |
| Granule weight (mg) | 42.0 | 50.0 | 40.5 | 39.9 |
| Strand temperature (°C.) | 118 | 144 | 143 | 154 |
| Degree of crystallization (%) | 20.2 | 19.4 | 20.2 | 19.4 |

I claim:

1. Process for simultaneous drying and crystallization of crystallizable thermoplastic in which the plastic is extruded from the melt via dies as strands, solidified at the surface by quenching in water, and crystallized and dried by treatment with gas, using a mechanism for cooling and drying the strands (26) after being extruded, having a discharge chute (8) with its entrance below the dies and a mechanism producing a flow of coolant liquid in a quenching section (A) within the discharge chute (8), having a following dewatering section (E) in which the discharge chute (8) is provided with openings (20) for the free passage of the coolant liquid, having a connected drying section (T) in which the discharge chute (8) is provided with closely spaced nozzles (30) for the passage of gas, and with a granulator (13) following the drying section (T), wherein the lengths of the quenching section (A), the dewatering section (E) and the drying section (T) are selected, considering the speed of the strands (26) through the discharge chute (8), so as to give a processing time of not more than about 1.5 seconds in the quenching section (A) to attain a surface temperature for the strands (26) of at least 100° C., a processing time of not more than about 0.1 second in the dewatering section (E), and a processing time of not more than about 20 seconds in the drying section (T) with the surface temperature at the end of the quenching section (A) being generally maintained through the drying section.

2. Process according to claim 1, wherein the fact that in the dewatering section (E) the strands (26) are exposed to an air flow which dries them after the coolant liquid has drained off.

3. Process according to claim 1 or 2, wherein the fact that the strands (26) are chopped into granules in the granulator (13) adjoining the drying section (T).

4. Process according to claim 3, wherein the fact that the surface temperature of the granules is maintained essentially at the surface temperature of the strands (26) in the region of the drying section (T).

5. Process according to claim 1, wherein the crystallizable thermoplastic is polyethylene terephthalate.

* * * * *